UNITED STATES PATENT OFFICE.

RUDOLF SCHWABE, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

OXYPHENYLQUINOLIN-DICARBOXYLIC ACID AND PROCESS OF MAKING SAME.

1,181,485.  Specification of Letters Patent.  Patented May 2, 1916.

No Drawing.  Application filed December 4, 1914. Serial No. 875,520.

*To all whom it may concern:*

Be it known that I, RUDOLF SCHWABE, Ph. D., chemist, a citizen of the Empire of Germany, residing at Höchst-on-the-Main, Germany, have invented certain new and useful Improvements in Oxyphenylquinolin-Dicarboxylic Acid and Processes of Making Same, of which the following is a specification.

I have found that by condensing acetosalicylic acid $$(COCH_3 : OH : COOH = 5:2:1)$$

with isatinic acid a compound, constituting a hydroxyphenylquinolindicarboxylic acid, is obtained which is of great therapeutical value, particularly in the treatment of arthritic and rheumatic affections. The reaction leading to the formation of said compound takes place according to the following equation:

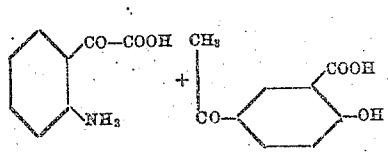 + 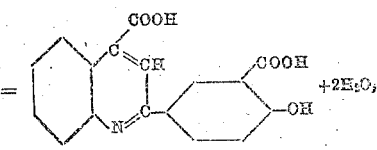 $+ 2H_2O$,

The new compound is insoluble in water and ligroin, difficultly soluble in alcohol and methly alcohol; it forms a yellowish powder and melts at about 283–284° C. with decomposition. It dissolves readily in alkalies, forming for example a well crystallizing disodium salt, the solution of which is of neutral reaction and which assumes an intense yellow color on addition of caustic soda. If the acid is dissolved in alcohol and ferric chlorid added thereto, the solution assumes a deep brownish-red color.

The following example illustrates my invention: 147 parts of isatin are dissolved in 600 parts of caustic potash lye of 33 per cent. strength and to the solution of isatinic acid thus obtained are added 180 parts of acetosalicylic acid and the whole is heated on the water bath for about 8 hours. From the resulting solution the hydroxyphenylquinolindicarboxylic acid is precipitated by acidulating with hydrochloric acid, then filtered off and washed with hot alcohol; if required, it may be purified by crystallization of its diethyl ester (melting point 103° C.) or its disodium salt.

Having now described my invention what I claim is:

1. As a new product, the hydroxyphenylquinolin-dicarboxylic acid corresponding to the formula:

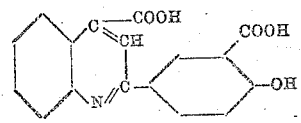

being a yellowish powder, melting with decomposition at about 283–284° C., insoluble in water or ligroin, difficultly soluble in alcohol and methyl alcohol, forming a readily soluble disodium salt, the solution of which is of neutral reaction; the alcoholic solution of the acid yielding a deep brownish-red coloration when ferric chlorid is added.

2. The process of preparing salts of hydroxyphenylquinolin-dicarboxylic acid, which consists in heating acetosalicylic acid with isatinic acid in an alkaline solution.

In testimony whereof I affix my signature in presence of two witnesses.

RUDOLF SCHWABE.

Witnesses:
  JEAN GRUND,
  CARL GRUND.